United States Patent [19]
Omoto et al.

[11] Patent Number: 5,169,206
[45] Date of Patent: Dec. 8, 1992

[54] SLIDABLE ROOF CONTROL DEVICE FOR A MOTOR VEHICLE

[75] Inventors: Seiichi Omoto; Kenji Matsumoto; Satoshi Kubota, all of Hiroshima, Japan

[73] Assignee: Mazda Motor Corporation, Hiroshima, Japan

[21] Appl. No.: 723,612

[22] Filed: Jul. 1, 1991

Related U.S. Application Data

[63] Continuation of Ser. No. 476,550, Feb. 7, 1990, abandoned.

[30] Foreign Application Priority Data

Feb. 10, 1989 [JP] Japan .................................. 1-32189

[51] Int. Cl.$^5$ ................................................ B60J 7/06
[52] U.S. Cl. .................... 296/219; 296/223; 307/10.1; 318/466
[58] Field of Search .................... 296/219, 220, 223; 307/10.1, 115, 140, 141; 318/466-468; 49/24, 28-31

[56] References Cited

U.S. PATENT DOCUMENTS

| | | | |
|---|---|---|---|
| 2,103,372 | 12/1937 | Lange | 296/223 X |
| 2,985,483 | 5/1961 | Bishop | 296/219 X |
| 3,376,429 | 4/1968 | Atkins et al. | 307/141 |
| 3,702,430 | 11/1972 | Knetsch | 296/223 X |
| 3,727,348 | 4/1973 | Steinmann et al. | 49/28 |
| 3,815,005 | 6/1974 | Berger | 318/466 |
| 4,048,662 | 9/1977 | Burguburu | 361/31 |
| 4,329,594 | 5/1982 | Bohm | 296/223 X |
| 4,502,726 | 3/1985 | Adams | 296/223 X |
| 4,561,691 | 12/1985 | Kawai et al. | 296/216 |
| 4,621,223 | 11/1986 | Murakami et al. | 49/28 X |
| 4,634,945 | 1/1987 | Takemura et al. | 49/28 X |
| 4,733,145 | 3/1988 | Ohashi et al. | 307/10.1 X |
| 4,857,803 | 8/1989 | Matsumoto et al. | 318/466 X |

FOREIGN PATENT DOCUMENTS

| | | | |
|---|---|---|---|
| 0336414 | 4/1989 | European Pat. Off. | |
| 3527405 | 2/1987 | Fed. Rep. of Germany | 296/223 |
| 3532111 | 3/1987 | Fed. Rep. of Germany | 296/223 |
| 3723598 | 1/1988 | Fed. Rep. of Germany | |
| 3728008 | 3/1989 | Fed. Rep. of Germany | 296/223 |
| 0104419 | 6/1985 | Japan | 296/223 |
| 0241216 | 10/1986 | Japan | 296/223 |
| 63-40228 | 3/1988 | Japan | |
| 63-82883 | 4/1988 | Japan | |
| 0112217 | 5/1988 | Japan | 296/219 |
| 0275422 | 11/1988 | Japan | 296/223 |
| 0275424 | 11/1988 | Japan | 296/223 |
| 0012915 | 1/1989 | Japan | 296/223 |
| 165013 | 1/1934 | Switzerland | 296/219 |
| 1315364 | 5/1973 | United Kingdom | |

Primary Examiner—Dennis H. Pedder
Attorney, Agent, or Firm—Wenderoth, Lind & Ponack

[57] ABSTRACT

A slidable roof control device for a motor vehicle wherein a roof panel opening of a motor vehicle is covered with a slidable roof which can be opened both in forward and rearward directions of the vehicle body. The control device includes a first forwardly located ON/OFF command mechanism operable from the driver seat for commanding a drive mechanism to open or close the flexible member, a second rearwardly located ON/OFF command mechanism operable from the rear seat for commanding the drive mechanism to open or close the flexible member, and a control mechanism. The control mechanism is responsive to outputs from the first and second ON/OFF command mechanisms for controlling the activation of the drive mechanism and for restricting the closing motion of the rear portion of the slidable roof as a result of commands from the first ON/OFF command mechanism.

13 Claims, 10 Drawing Sheets

SLIDABLE ROOF CONTROL DEVICE FOR A MOTOR VEHICLE

This application is a continuation of now abandoned application, Ser. No. 07/476,550 filed on Feb. 7, 1990.

BACKGROUND OF THE INVENTION

1. Field of the Invention

The present invention relates to a slidable roof control device for a motor vehicle.

2. Description of the Prior Art

A slidable roof apparatus equipped with a flexible slidable roof member for covering a roof panel opening of a motor vehicle wherein the flexible member is openable from the forward to the rearward direction of a vehicle body has been known in the art as disclosed in Japanese Utility Model Application Laying Open Gazette No. 63-40228.

However, this type of slidable roof apparatus opens only the front of the roof panel opening of the vehicle body by opening the flexible member. Therefore, when there are passengers in the rear seat, the flexible member is folded into the rear portion of the roof panel opening and overlies the passengers in the rear seat. This means that even if the roof panel opening is fully opened, the passengers in the rear seat may feel uncomfortable and stifled.

Therefore, the applicant invented a device wherein a roof panel can be slidable in the forward and the rearward direction of the vehicle body so as to open the roof panel both from the front and the rear side thereof.

However, a problem arises in such a device in which the rear portion of the slidable roof is openable, because there is a possibility that passengers may be caught by the slidable roof member in the roof panel opening if the slidable roof is closed when they are standing on the rear seat.

SUMMARY OF THE INVENTION

The primary object of the present invention is to provide a slidable roof control device for a motor vehicle which can offer passengers in the rear seat a comfortable ride and eliminate the possibility that passengers may be caught by the roof member in the roof panel opening.

To achieve the above-mentioned objects, a slidable roof control device for a motor vehicle in the present invention is provided with a roof panel constituting an upper portion of a vehicle body, a roof panel opening provided on the roof panel of the vehicle body and enclosed with a front header, a right and a left roof rail and a rear header, and a flexible member mounted on the roof panel and foldable in the longitudinal direction of the vehicle body. The flexible member is selectively movable between a folded state for opening the roof panel opening and an extended state for closing the roof panel opening. This device comprises: drive means operatively interconnected with a front and a rear portion of the flexible member for selectively moving the front portion thereof in the rearward direction of the vehicle body so as to open the front portion of the roof panel opening and in the forward direction so as to close the front portion of the roof panel opening, and for selectively moving the rear portion of the flexible member in the forward direction so as to close the rear portion of the roof panel opening and in the rearward direction so as to open the rear portion of the roof panel opening; first ON/OFF command means provided on the driver seat (or in a forward location in the vehicle) for commanding the drive means to open or close the flexible member; second ON/OFF command means provided on the rear seat (or in a rearward location in the vehicle) for commanding the drive means to open or close the flexible member; and control means responsive to the output from the first and the second ON/OFF command means, for controlling the activation of the drive means and restricting the closing motion of the rear portion of the slidable roof at least by the first ON/OFF command means.

In this invention, the drive means is desirably equipped with a first drive motor and a second drive motor. The first drive motor is operatively interconnected with the front portion of the flexible member so as to move the front portion thereof. The second drive motor is operatively interconnected with the rear portion of the flexible member so as to move the rear portion thereof.

The aforementioned control means is operable to restrict the closing motion of the rear portion of the slidable roof member in response to a command by the first ON/OFF command means. For example, the control means prohibits the closing motion of the rear portion of the slidable roof member in response to a command by the first ON/OFF command means.

A further object of the present invention is to provide a slidable roof control device for a motor vehicle equipped with a first ON/OFF command means comprising a switch, by which the flexible member can be closed only when the first ON/OFF command means carries out a second control step by which the closing motion of the flexible member is begun, after a first control step which does not start the closing motion of the flexible member (i.e. after two discrete commands by the first ON/OFF command means). Accordingly, in the present invention, the first ON/OFF command means does not operate to close the flexible member after just the first control step, but merely operates to arouse an operator's attention to the safety of the rear passengers. The flexible member then closes after the second control step. In this way, the safety of passengers on the rear seat is guaranteed.

The present invention provides a slidable roof control device for a motor vehicle wherein the second ON/OFF command means commands the opening and the closing of only the rear portion of the flexible member.

The device of the present invention is controlled so that the control means regulates the drive means to close the rear portion of the slidable roof when the first ON/OFF command means continues for a predetermined period of time to issue a command to close the rear portion of the slidable roof.

Furthermore, the present invention is to provide a slidable roof control device for a motor vehicle which is provided with a roof panel constituting an upper portion of a vehicle body, a roof panel opening provided on the roof panel of the vehicle body and enclosed with a front header, right and left roof rails and a rear header, and a flexible member mounted on the roof panel and foldable in the longitudinal direction of the vehicle body. The flexible member is selectively movable between a folded state for opening the roof panel opening and an extended state for closing the roof panel opening. This device comprises: drive means operatively interconnected with a rear portion of the flexible member for selectively moving the rear portion thereof in the forward direction of the vehicle body so as to open the rear portion of the roof panel opening and in the rearward direction so as to close the rear portion of the roof panel opening; first ON/OFF command means provided on the driver seat (or in a forward location in the vehicle) for commanding the drive means to open or close the rear portion of the flexible member; second ON/OFF command means provided on the rear seat (or in a rearward vehicle location) for commanding the drive means to open or close the rear portion of the flexible member; and control means responsive to the output from the first and second ON/OFF command means, for controlling the activation of the drive means and restricting the close motion of the rear portion of the slidable roof at least in response to the first ON/OFF command means.

The foregoing and other objects, and novel features of the invention will become more apparent upon reading the following detailed description in conjunction with the drawings.

BRIEF DESCRIPTION OF THE DRAWINGS

The accompanying drawings show a preferred embodiment of the present invention, in which.

DETAILED DESCRIPTION OF THE PREFERRED EMBODIMENT

A preferred embodiment of the present invention will be described in detail in connection with the accompanying drawings.

Figure 1:
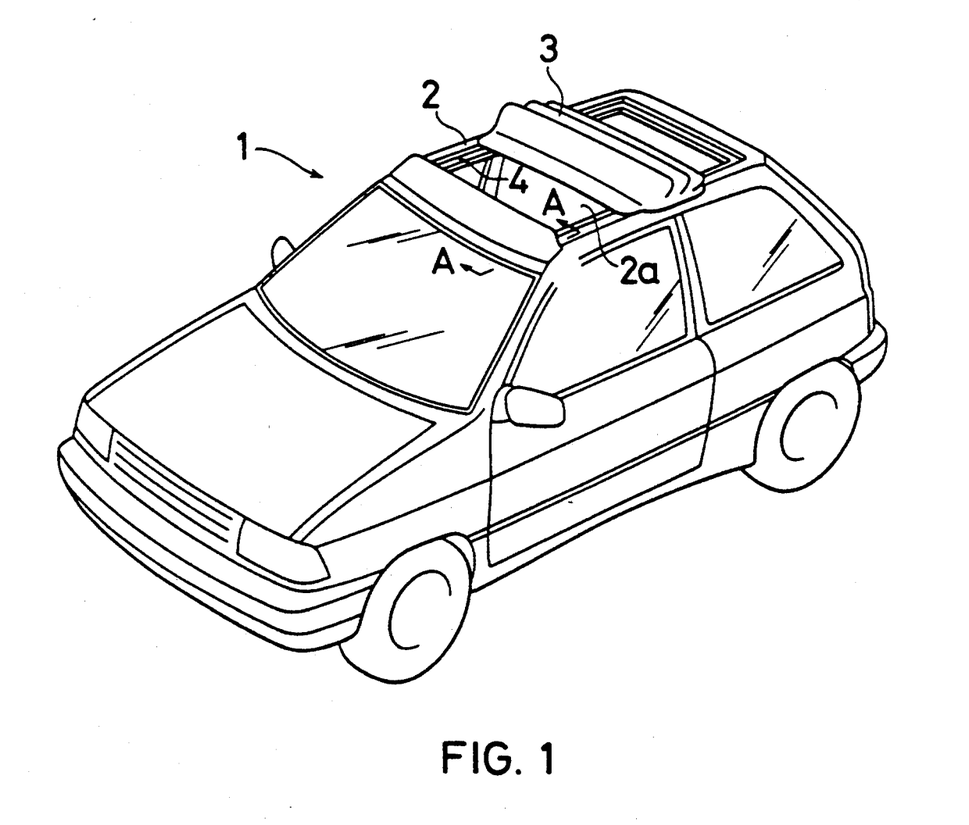
FIG. 1 is a perspective view of a motor vehicle which has adopted the present invention.

Referring to FIG. 1, reference numeral 1 designates a motor vehicle. A roof panel 2 of the motor vehicle 1 has an opening 2a. This roof panel opening 2a is openably and closably covered with a flexible member 3 (a hood member). More specifically, the flexible member 3 is foldably provided on the vehicle roof panel 2 so as to be selectively movable in the longitudinal direction between a folded state for opening the roof panel opening 2a and an extended state for closing the opening 2a.

Figure 2:
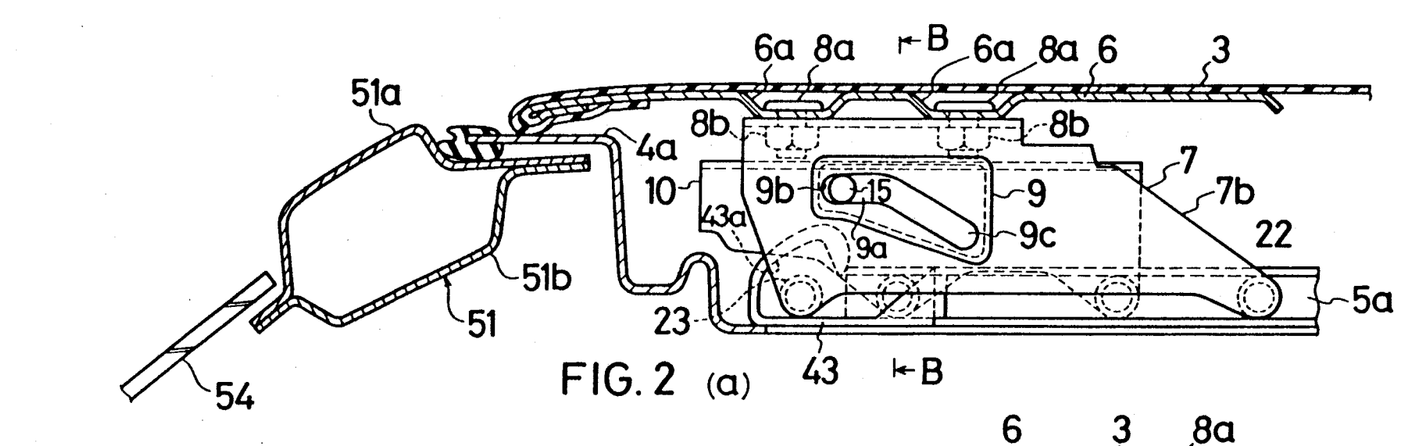
FIG. 2(a) is a sectional view taken along the line A—A of FIG. 1.
FIG. 2(b) is a sectional view taken along the line B—B of FIG. 2(a)

Mounted on the vehicle roof panel 2 is a rectangular-shaped frame member 4. Guide rails 5, 5 (refer to FIGS. 2(a) and (b)) are provided at both sides of the frame member 4. Foldably mounted along the guide rails 5, 5 is the flexible member 3 so as to be openable (foldable) in the longitudinal direction of the vehicle body in both the forward or rearward directions thereof.

More closely looking at the front portion of the flexible member 3, as shown in FIGS. 2(a) and (b), formed at the right and the left side of a front plate member 6 are mounting portions 6a, 6a on which a mounting bracket 7 is fixed by means of bolts 8a and nuts 8b. The mounting bracket 7 includes a base 7a fixed on the mounting portions 6a, 6a, and a supporting portion 7b extending downwardly from the outer periphery of the base 7a. A cam member 9 having a cam groove 9a is secured by the supporting portion 7b. The cam groove 9a includes a front horizontal groove portion 9b extending substantially in the horizontal direction, and a rear inclined groove portion 9c extending downwardly and rearwardly from the rear end of the horizontal groove portion 9b.

A slider 10 having a substantially inverted U-shape in cross section is connected with the mounting bracket 7 by means of an engaging pin 15. This engaging pin 15 slidably engages with the cam groove 9a of the cam member 9a. The engaging pin member 15 projects sideward from the upper portion of the slider 10. The end portion of the engaging pin member 15 passing through the cam groove 9a of the cam member 9 is provided with a snap ring 16 whereby the mounting bracket 7 and the slider 10 are connected. The engagement between the engaging pin member 15 and the cam groove 9a of the cam member 9 constitutes a tilt means K for tilting up the front portion of the flexible member 3 at the initial phase of the opening operation.

The rear part of the supporting portion 7b of the mounting bracket 7 has, at the lower end thereof, a shoe member 22 which slidably engages with an outside guide groove 5a of the guide rail 5, while the front part of the supporting portion 7b has, at the lower end thereof, another shoe member 23 which slides on the upper surface of the guide rail 5. Thus, with this arrangement, the front end portion of the flexible member 3 moves upward when the flexible member 3 retreats (i.e. as it is folded).

The slider 10 slidably engages with an inside guide groove 5b of the guide rail 5 by means of shoe members 24, 24. A guide bracket 11 corresponding to the guide rail 5 is fixed to the slider 10. The guide bracket 11 is also connected with a front drive wire 12 which is located in a housing groove 5c outside the guide rail 5.

Figure 4:
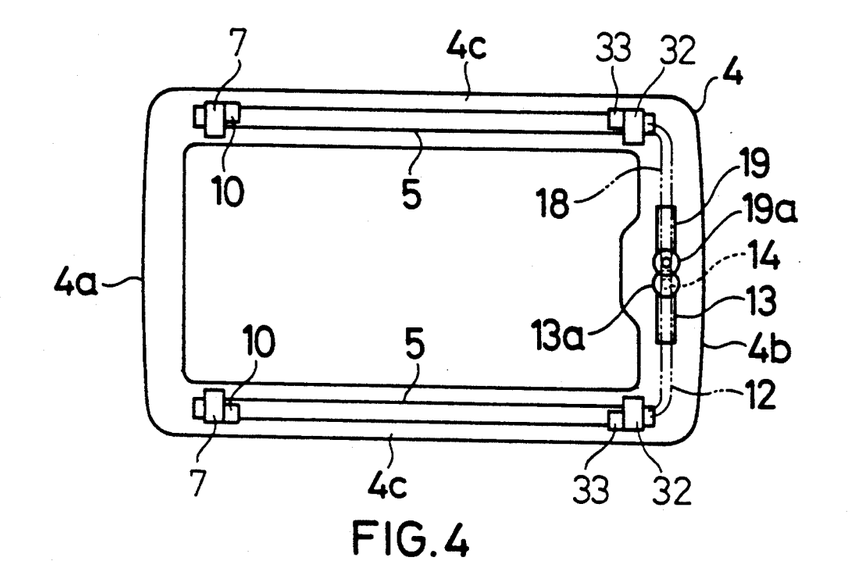
FIG. 4 is a schematic plan view of a frame member.
Figure 5:
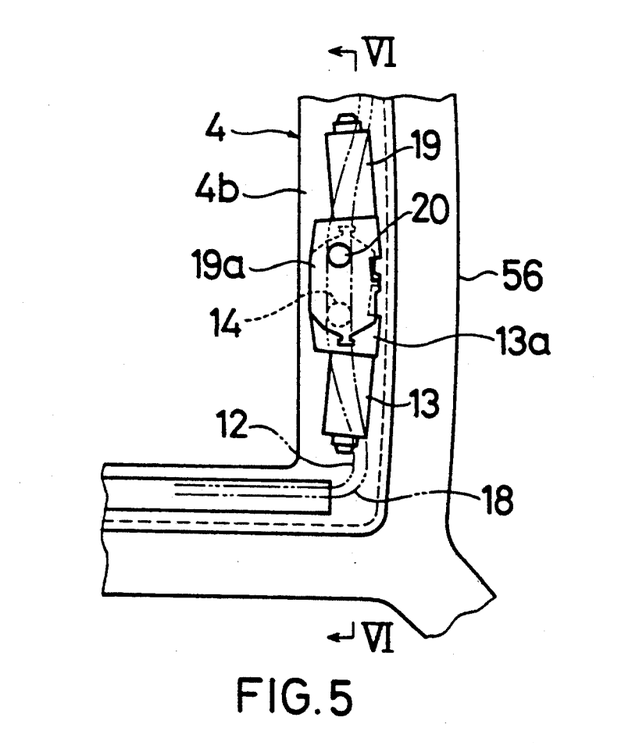
FIG. 5 is a partly plan view showing a portion wherein a drive motor is mounted.
Figure 6:
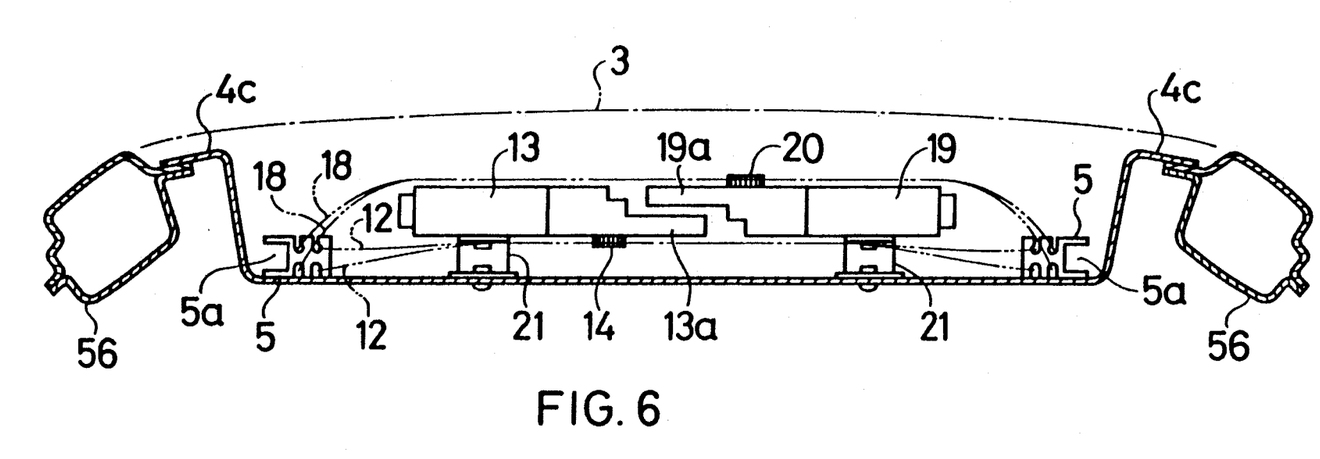
FIG. 6 is a sectional view taken along the line VI—VI of FIG. 5.
Figure 7:
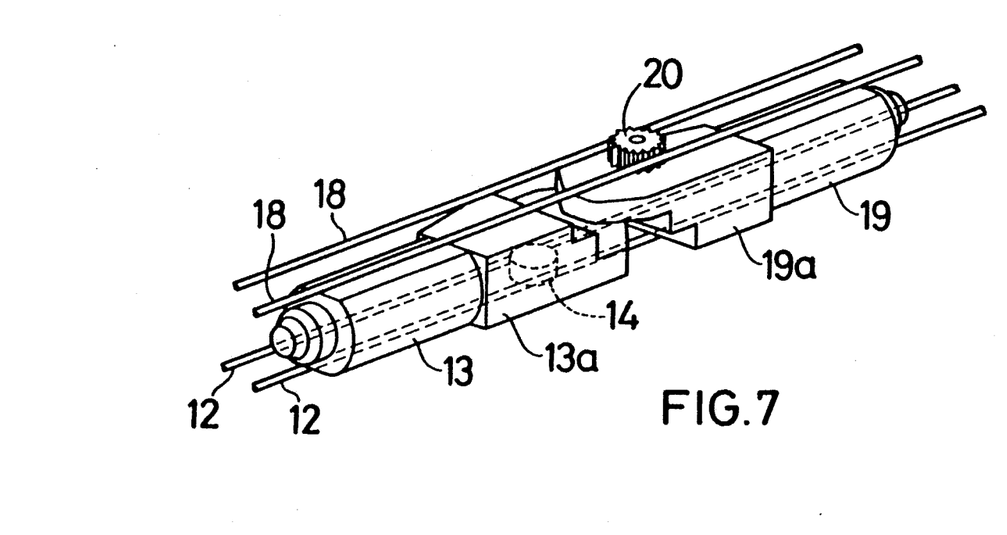
FIG. 7 is a perspective view showing the relation among the drive motor, a drive wire and a gear.

As shown in FIGS. 4 though 7, the drive wire 12 engages with a gear 14 which is rotated by a first drive motor 13 located substantially at the center of the rear side of the frame member 4. Then the drive wire 12 extends inside a front idle cable housing portion 41a, an outer idle cable housing of a cable housing member 41 located below the other guide rail 5. With the rotation of the first drive motor 13, the drive wire 12 opens the front portion of the flexible member 3. As a result, the front portion of the roof panel opening 2a is opened.

Accordingly, when opening the front portion of the flexible member 3, first the slider 10 withdraws and this withdrawal changes the relation of the engagement between the engaging pin member 15 and the cam groove 9a of the cam member 9 so as to restrict the position of the mounting bracket 7. Then the front portion of the mounting bracket 7 moves upward against the slider 10. As a result, the front plate member 6, i.e. the front portion of the flexible member 3, tilts up and then withdraws to open.

Figure 3:
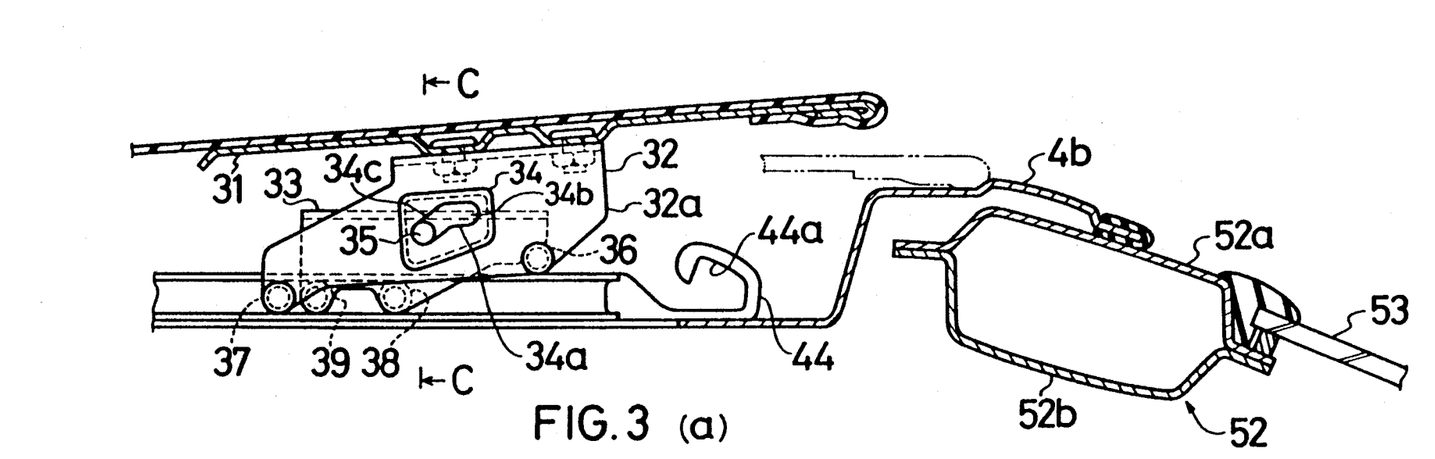
FIG. 3(a) is a view similar to FIG. 2(a) but showing the rear of a roof panel opening of a vehicle body.
FIG. 3(b) is a sectional view taken along the line C—C of FIG. 3(a)

The rear portion of the flexible member 3 opens in the same manner as the front portion thereof. That means the rear plate member 31, i.e. the rear portion of the flexible member 3, tilts up and then moves forward to open the rear of the roof panel opening 2a. More specifically, as shown in FIGS. 3(a), (b), a mounting bracket 32 is fixed on the rear plate member 31. A slider 33 is connected with a supporting portion 32a of the mounting bracket 32 by means of an engaging pin member 35 which slidably engages with a cam groove 34a of a cam member 34 fixed on the mounting bracket 32. In contrast with the cam groove 9a of the front cam member 9, the cam groove 34a comprises a rear horizontal groove portion 34b extending substantially in the horizontal direction, and an inclined groove portion 34c extending downwardly and forwardly from the front end of the horizontal groove portion 34b. The mounting bracket 32 and the slider 33 are provided with guide shoes 36, 37 and 38, 39.

A rear drive 18 is connected, by means of a guide bracket 40, with the slider 33 which tilts up or opens the rear plate member 31. The rear drive wire 18 is disposed in a housing groove 5d inside the guide rail 5. The rear drive wire 18 engages with a gear 20 which is rotated by a second drive motor 19 located substantially at the center in the rear portion of the frame member 4. Then the rear drive wire 18 extends inside a rear idle cable housing portion 41b, an inner idle cable housing of the housing member 41 located below the other guide rail 5. With this arrangement, the rear drive wire 18 is operated by the rotation of the second drive motor 19.

Both first and second drive motors 13, 19 are located substantially at the center of the rear portion of the frame member 4. In this way, the first and second drive motors 13, 19 are disposed in one place so as not to reduce the opening area of the roof panel opening 2a. Furthermore, a portion of reduction gear parts 13a, 19a which are small in the vertical direction are vertically superposed. In this way, a relatively small space (especially the space in the widthwise direction) is required for disposing the first and the second motors 13, 19. The gears 14, 20 are located respectively under the reduction gear part 13a and above the reduction gear part 19a. The drive motors 13, 19 are mounted on the frame member 4 by means of brackets 21, 22 (refer to FIG. 6).

Stopper members 43, 44 are mounted respectively at the front and rear ends of the guide rails 5, 5. The interval in the longitudinal direction between the stopper members 43, 44 is set longer than the length of the flexible member 3 when the flexible member 3 is in the fully-closed state by its tensile force. Accordingly, whether the front portion closes first or the rear portion closes first, the flexible member 3 is always fully extended when closed. The stopper members 43 and 44 are provided with upwardly-indented stopper grooves 43a, 44a with which the guide shoes 23, 36 engage. For example, if the front portion of the flexible member 3 (the guide shoe 23) first makes contact with the stopper member 43, the front portion tends to be pulled rearwardly when closing the rear portion. However, this force in the rearward direction is a tensile force of the flexible member 3 and it acts upwardly against the engaging pin member 15. Therefore, the front portion of the flexible member 3 (the front plate member 6) pivotally moves upward with the engaging pin member 15 as a rotational axis. Thus, the guide shoe 23 engages with the stopper groove 43a of the stopper member 43. As a result, the rearward force can be restricted. On the other hand, when opening the front portion of the flexible member 3, force is generated by the drive wire 12. This force acts downwardly against the engaging member 15. Therefore, even when the guide shoe 23 engages with the stopper groove 43a of the stopper member 43, the engagement is released. Thus, the front portion of the flexible member 3 withdraws smoothly, opening the roof panel opening 2a.

Although not shown in the drawings, a folding mechanism as disclosed in Japanese Utility Model Application Laying Open Gazette No. 63-40228 is mounted between the front plate member 6 and the rear plate member 31 in the flexible member 3. This folding mechanism makes the flexible member 3 foldable.

A front portion 4a of the frame member 4 is provided on a front header 51 with a closed cross section. The front header 51 comprises an upper panel 51a and a lower panel 51b. The front portion 4a of the frame member 4 extends rearwardly from the front header 51. The part where the front portion 4a extends from the front header 51 is covered with the front portion of the flexible member 3 (the front plate member 6). Likewise, the rear portion 4b of the frame member 4 is provided on a rear header 52 with a closed cross section. The rear header 52 comprises an upper panel 52a and a lower panel 52b. Reference numerals 53, 54 designate respectively a rear window glass and a front window glass.

Side portions 4c, 4c of the frame member 4 are mounted on an outer portion 56a of a roof rail 56 with a closed cross section. The roof rail 56 comprises this roof rail outer portion 56a and a roof rail inner portion 56b. The roof rail 56, as well as the front header 51 and the rear header 52 enclose the roof panel opening 2a.

Figure 8:
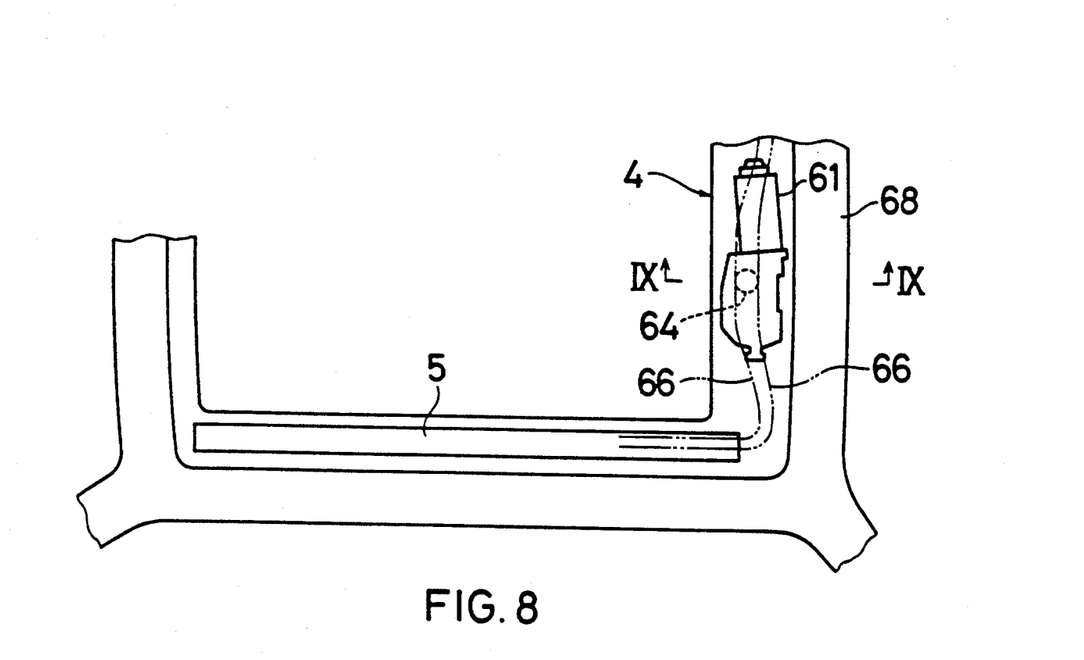
FIG. 8 is a schematic plan view showing another embodiment.
Figure 9:
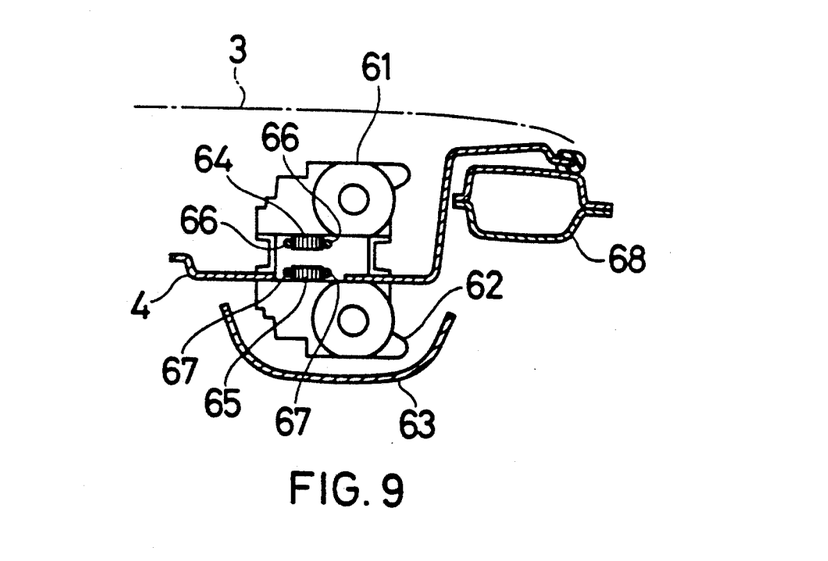
FIG. 9 is a sectional view taken along the line IX—IX of FIG. 8.

In the aforementioned embodiment of the present invention, a portion of the reduction gear parts 13a, 19a of the first and the second drive motors 13, 19 are vertically superposed. However, the superpositioning of the reduction gear parts 13a, 19a is not limited to the vertical direction. Furthermore, not only small portions but also the entirety of the reduction gear parts 13a, 19a can be superposed. As shown in FIGS. 8 and 9, the drive motors 61, 62 can be disposed in upper and lower positions in the frame member 4 so as to be entirely superposed. In this case, the lower drive motor 62 is covered with a trim 63. Reference numerals 64, 65 designate gears with which the drive wires 66, 66, 67, 67 engage. Reference numeral 68 designates a rear header.

Figure 15:
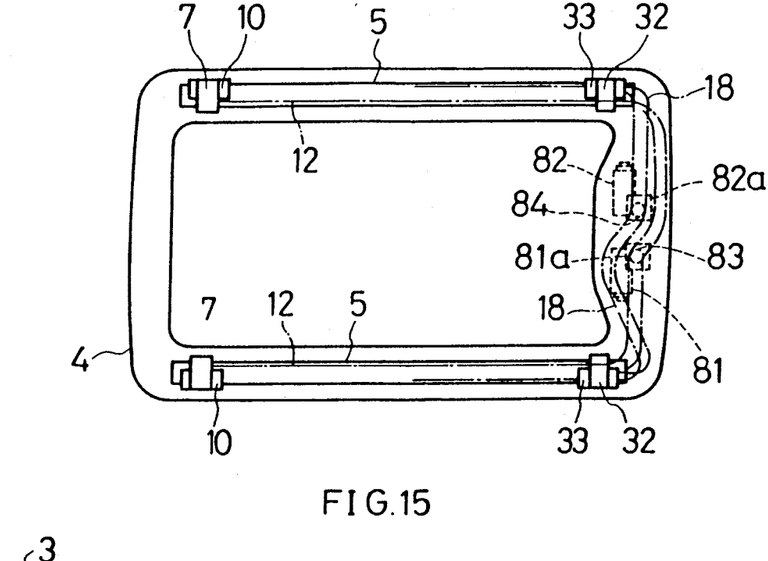
FIG. 15 is a plan view of the frame member which is provided with the drive motor.
Figure 16:
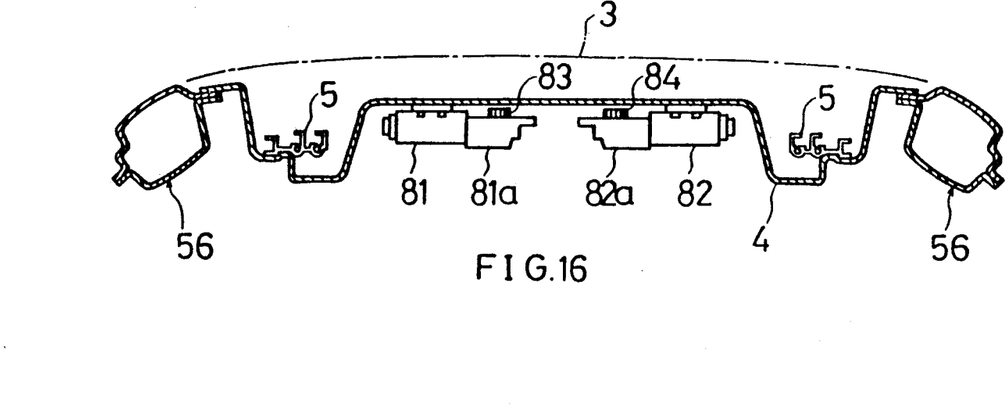
FIG. 16 is a sectional view showing a portion wherein the drive motor is mounted.

In addition, as shown in FIGS. 15 and 16, the drive motors 81, 82 having the reduction gear parts 81a, 82a can be mounted apart from each other instead of being superposed. That means the drive motors 81, 82 are disposed in the lower position of the frame member 4 so that the drive motors 81, 82 are spaced apart in the widthwise direction of the vehicle body. In this case, each of the drive motors 81, 82 is covered with trim (not shown in the drawings). Reference numerals 82, 84 designate gears with which drive wires 12, 12, 18, 18 engage.

The following is a description of a control system which controls the above-mentioned drive motors 13, 19 (61, 62).

Figure 10:
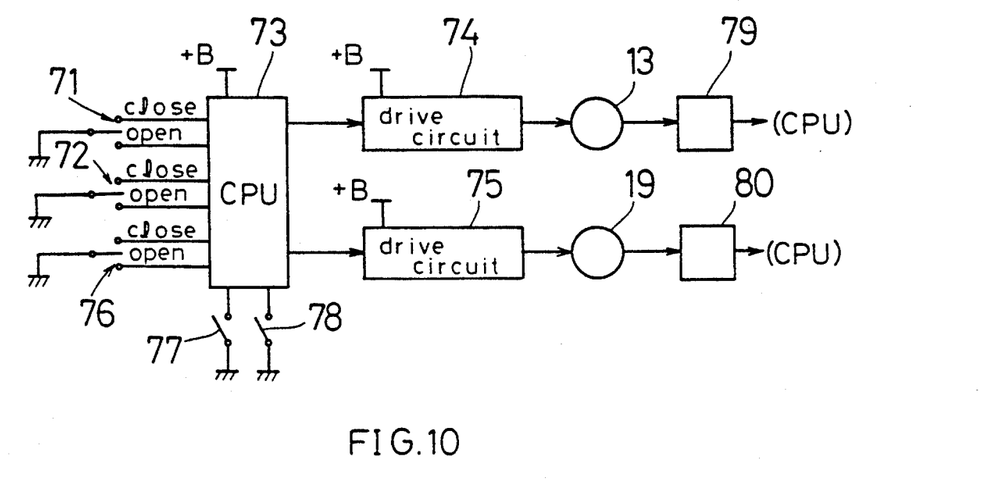
FIG. 10 is a block diagram showing a construction of a control system.
Figure 17:
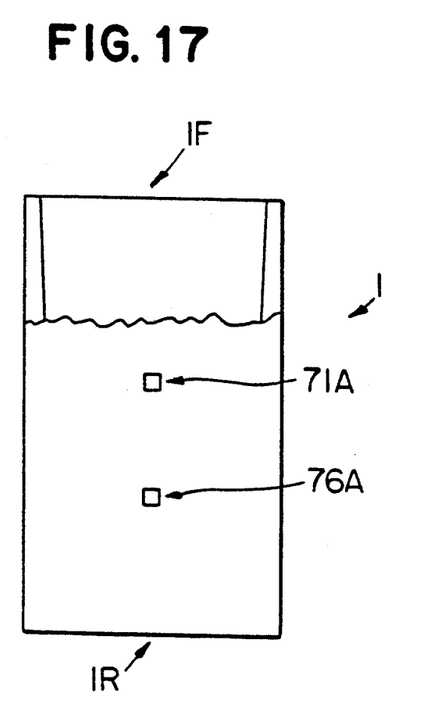
FIG. 17 is a schematic plan view showing relative locations of first and second ON/OFF command means in the motor vehicle.

In FIG. 10, reference numerals 71, 72 designate respectively a forwardly located front switch, or first front switch means, (i.e. a switch located in a forward position in the vehicle for use in controlling movement of the front portion of the flexible member 3) and a forwardly located rear switch, or first rear switch means, (i.e. a switch located in a forward position in the vehicle for use in controlling movement of the rear portion of the flexible member 3), which together define the first ON/OFF command means 71A (see FIG. 17, in which 1F designates a front of the motor vehicle 1 and 1R designates a rear of the motor vehicle 1). Each of the switches 71, 72 is provided close to the driver seat for opening or closing the front and rear portions, respectively, of the flexible member 3. CPU 73 receives ON/OFF signals from the switches 71, 72 and controls the first and second drive motors 13, 19 by means of the drive circuits 74, 75.

Reference numeral 76 designates a rearwardly located rear switch (i.e. a switch located in a rearward location in the vehicle for use in controlling the rear portion of the flexible member 3), which defines the second ON/OFF command means 76A and is provided close to the rear seat for opening or closing the rear portion of the flexible member 3. The CPU 73 receives ON/OFF signals from the switch 76 and controls the activation of the second drive motor 19 by means of the drive circuit 75.

Reference numerals 77, 78 designate respectively a front limit switch and a rear limit switch. These front and rear limit switches 77, 78 sense the tilt-up state of the front and rear portions, respectively, of the flexible member 3 and then input detection signals to the CPU 73.

Reference numerals 79, 80 designate lock detecting means for the drive motors 13, 19. The lock detecting means 79, 80 detect when the respective front and rear portions of the flexible member 3 are fully open or fully closed (refer to FIG. 1), and then sends a detection signal or signals to the CPU 73. Finally, upon receiving the signal or signals from the lock detecting means, CPU 73 prohibits the drive circuit 74, 75 from sending the operation signal to the respective drive motors 13, 19, such that activation of the respective drive motor 13, 19 is terminated.

Control for opening and closing the front portion of the flexible member 3 by the above-mentioned control system can be carried out by ON/OFF operation of the forwardly located front switch 71. When turning the forwardly located front switch 71 into the open position, the first drive motor 13 is activated to tilt up the front portion of the flexible member 3. In detail, the activation of the first drive motor 13 operates the drive wires 12, 12. As a result, the slider 10 slightly withdraws backward and causes movement of the engaging pin member 15 from the horizontal groove portion 9b to the inclined groove portion 9c of the cam groove 9a of the cam member 9. Since the position of the engaging pin member 15 is restricted in the vertical direction, the front part of the mounting bracket 7 moves upward. In other words, the rear shoe member 22 of the mounting bracket 7 is positioned in the guide groove 5a of the guide rail 5 while the front shoe member 23 is positioned on the upper surface of the guide rail 5. Accordingly, since the mounting bracket 7 is attached on the front plate member 6 by means of the mounting portions 6a, 6b, the front plate member 6 tilts up, thereby creating a clearance between the rear portion of the flexible member 3 and the vehicle roof panel 2.

At the end of the tilting-up motion (i.e. when the front portion of flexible member 3 is in a fully tilted-up state), the front limit switch 77 enters into the ON state. When the forwardly located front ON/OFF switch 71 is then set in the open position, the drive motor 13 is activated and the front plate member 6 together with the slider 10 withdraw and cause folding of the front portion of the flexible member 3, thereby opening the front portion of the roof panel opening 2a.

When the flexible member 3 becomes fully opened, the lock detecting means 79 detects the locking state of the drive motor 13.

When setting the forwardly located front switch 71 in the closed position when the flexible member 3 is in this state, the front portion of the flexible member 3 is moved forwardly due to the activation of the drive motor 13. Accordingly, when the flexible member 3 reaches the front end position and the front ON/OFF switch 71 is again set in the closed position, the tilt-up state is released due to the activation of the drive motor 13 and, as a consequence, the front limit switch 77 is placed in an OFF state. Finally, the lock detecting means 79 detects the locking state, and is placed in an ON state indicating to the CPU 73 the end of the closing motion of the front portion of the flexible member 3.

Figure 11:
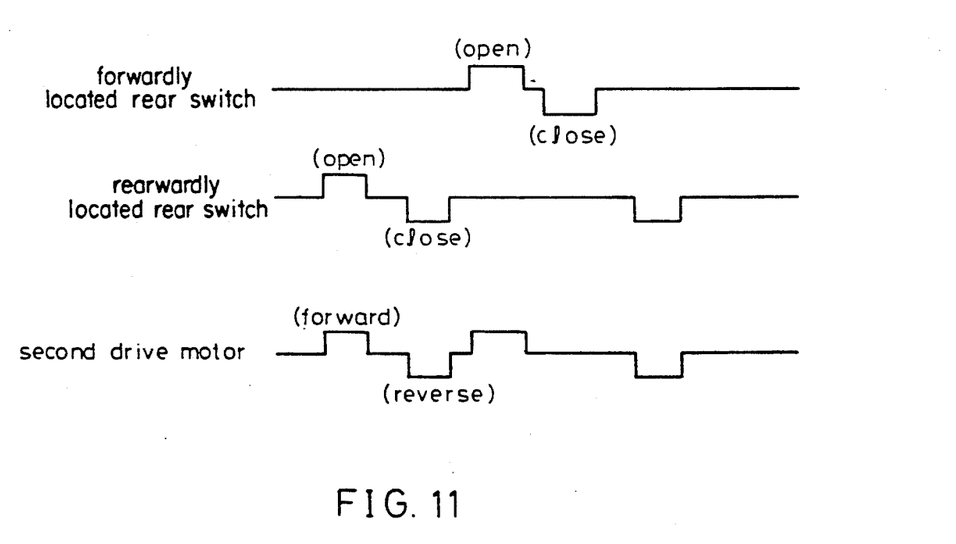
FIGS. 11 through 14 are time charts showing control operations.

As shown in FIG. 11, the opening and closing of the rear portion of the flexible member 3 is controlled by the forward and reverse rotation of the second drive motor 19 upon operation of the rearwardly located rear switch 76.

In detail, when forwardly-activating the second drive motor 19 by turning the rearwardly located rear switch 76 into the open position, the rear plate member 31 in the rear of the flexible member 3 moves forward along with the forward movement of the sliders 17, 17. Therefore, the rear portion of the flexible member 3 is tilted up and folded to open the rear portion of the roof panel opening 2a in the same manner as the front portion of the flexible member 3. Thus, the passengers in the rear seat can enjoy the upward view and can be made more comfortable. When reversely-activating the second drive motor 19, by turning the rearwardly located rear switch 76 into the closed position, the rear plate member 31 of the flexible member 3 moves backward, thus closing the rear portion of the roof panel opening 2a.

With respect to the forwardly located rear switch 72, it is possible to open the rear portion of the flexible member 3 by turning the forwardly located rear switch 72 into the open position. However, for the above-noted safety reasons, movement of the forwardly located rear switch 72 to the closed position, does not result in the CPU 73 sending a driving signal to the drive circuit 75. Accordingly, movement of the forwardly located rear switch 72 into the closed position does not cause reverse rotation of the second drive motor 19, with a result that the closing motion of the flexible member 3 is prevented by the CPU 73. This means that the rear portion of the flexible member 3 will never be closed by operation of the rear switch 72 by a driver or front seat passenger without obtaining the attention of passengers in the rear seat, in case they are standing on the rear seat.

Figure 12:
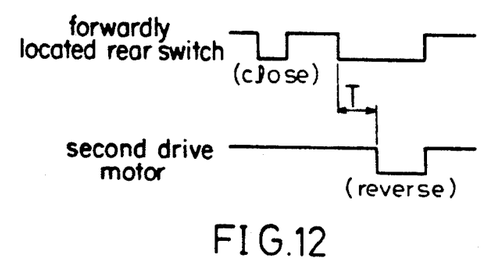

In the above-mentioned preferred embodiment, the rear portion of the flexible member 3 will never be closed by operation of the forwardly located rear switch 72. However, if the driver or front seat passenger pay attention to the rear seat passengers before closing the rear portion of the flexible member 3, it will not be unsafe to allow the rear portion of flexible member 3 to be closed by operation of the front seat rear switch. With this in mind, the operation of the forwardly located rear switch 72 can, as an alternative, be controlled such that the second drive motor 19 is reversely rotated by the forwardly located rear switch only after the forwardly located rear switch 72 has been continuously held in the closed position for more than a fixed period of time T. With this control scheme, the second drive motor 19 can never be activated by merely pressing the forwardly located rear switch 72 into the closed position (i.e. for less than time T).

Figure 13:
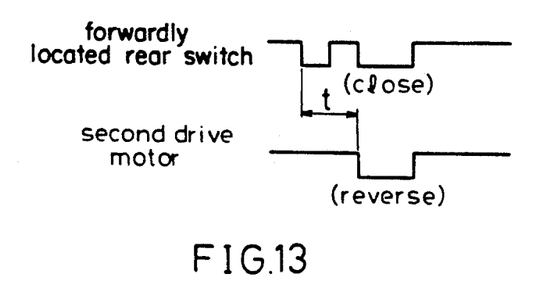

In addition, the operation of the forwardly located rear switch 72 can be limited in other ways. For example, as shown in FIG. 13, the operation of the rear switch 72 on the driver seat can be limited in such a manner that the second drive motor 19 is activated only when the rear switch 72 is turned into the closed position twice within a fixed period of time t. In other words, operation of the forwardly located rear switch 72 for closing the rear portion of the flexible member 3 is a two-step operation in which the second drive motor 19 is activated for the first time when the forwardly located rear switch 72 is moved to the closed position a first time and then a discrete second time within a fixed period of time t from the first time.

Figure 14:
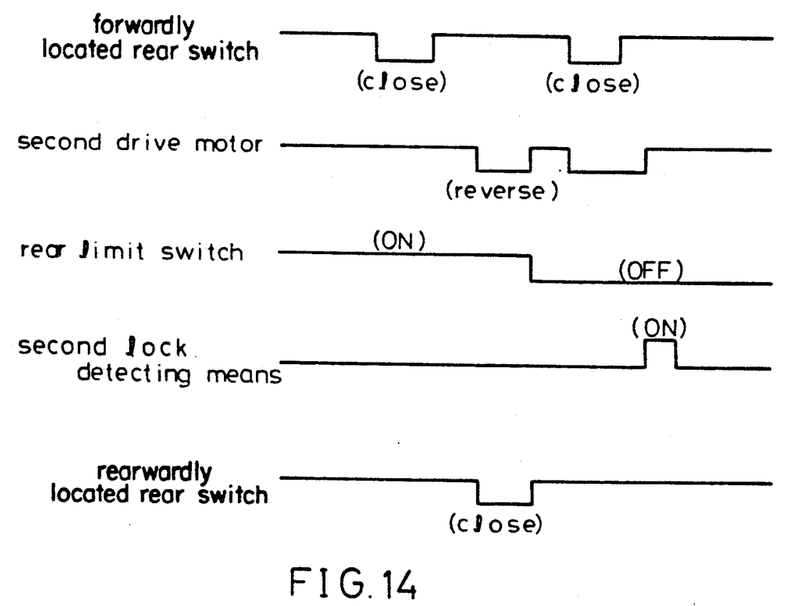

FIG. 14 illustrates a further alternative control arrangement wherein the rear portion of the flexible member 3 is prohibited from moving in a rearward direction of the vehicle body when it is in a fully tilted-up position and the rear limit switch 78 is in the ON state. In this arrangement, however, if the rear portion of the flexible member 3 is not in a fully tilted-up position but is also not in a fully closed condition (as would be indicated by the ON state of the second lock detecting means 80), the rear portion of the flexible member 3 can be moved rearwardly until it reaches its fully closed state. More specifically, the second motor 19 cannot be activated by moving the forwardly located rear switch 72 into the closed position when the rear limit switch 78 is in the ON state (i.e. the rear portion of flexible member 3 is fully tilted-up). On the other hand, the second drive motor 19 is caused to reversely-rotate when the forwardly located rear switch is moved to its closed position when the rear portion of the flexible member 3 is not in a fully tilted-up state, so as to close roof panel opening 2a.

When the rear portion of flexible member 3 reaches its fully closed position, the second lock detecting means 80 outputs an ON signal to the CPU 73, which then terminates operation of the second drive motor 19.

The aforementioned embodiments discussed the application of the invention to what is called a "canvas top" type motor vehicle wherein a slidable roof comprises a flexible member. Additionally, the present invention can be applied to a slide roof (a sun roof) of a motor vehicle wherein a slidable roof comprises a plate member.

As many apparently widely different embodiments of this invention may be made without departing from the spirit and scope thereof, it is to be understood that the present embodiment is therefore illustrative and not restrictive. The scope of the invention is defined by the appended claims rather than by the description preceding them, and all changes that fall within the meets and bounds of the claims, or equivalence of such meets and bounds are therefore intended to be embraced by the claims.

We claim:

1. A slidable roof control device for a motor vehicle having a roof panel defining an upper portion of a vehicle body, a roof panel opening formed in said roof panel and enclosed by a front header, a right roof rail, a left roof rail and a rear header, and a flexible member mounted on the roof panel and being foldable in the longitudinal direction of the vehicle body, said control device comprising:
first drive means operatively interconnected with a front portion of said flexible member for selectively moving said front portion of said flexible member rearwardly so as to open a front portion of the roof panel opening and forwardly so as to close the front portion of the roof panel opening;
second drive means operatively interconnected with a rear portion of said flexible member for selectively moving said rear portion of said flexible member forwardly so as to open a rear portion of the roof panel opening and rearwardly so as to close the rear portion of the roof panel opening;
first ON/OFF command means for commanding said first and second drive means to move said front and rear portions of said flexible member, said first ON/OFF command means comprising a first front switch means for commanding said first drive means to move the front portion of said flexible member, and a first rear switch means for commanding said second drive means to move the rear portion of the flexible member, said first front and rear switch means being mounted in a forward location in the motor vehicle and adapted to be accessible to a driver and a front seat passenger;
second ON/OFF command means for commanding said second drive means to move the rear portion of said flexible member, said second ON/OFF command means being mounted in a rearward location in the motor vehicle and adapted to be accessible to rear seat passengers; and
control means for controlling activation of said first and second drive means in response to commands from said first and second ON/OFF command means, and for restricting movement of said flexible member in response to commands by said first rear switch means of said first ON/OFF command means by completely and at all times prohibiting said second drive means from moving said rear portion of said flexible member rearwardly in response to commands by said first rear switch means of said first ON/OFF command means, so as to protect the rear seat passengers against unexpected closure of the rear portion of the roof panel opening.

2. A slidable roof control device as recited in claim 1, wherein
said first drive means comprises a first drive motor operatively interconnected with said front portion of said flexible member for moving said front portion of said flexible member, and said second drive means comprises a second drive motor operatively interconnected with said rear portion of said flexible member for moving said rear portion of said flexible member.

3. A slidable roof control device for a motor vehicle having a roof panel defining an upper portion of a vehicle body, a roof panel opening formed in said roof panel and enclosed by a front header, a right roof rail, a left roof rail and a rear header, and a flexible member mounted on the roof panel and being foldable in the longitudinal direction of the vehicle body, said control device comprising:

- drive means operatively interconnected with front and rear portions of said flexible member for selectively moving said front portion of said flexible member rearwardly so as to open a front portion of the roof panel opening and forwardly so as to close the front portion of the roof panel opening, and for selectively moving said rear portion of said flexible member forwardly so as to open a rear portion of the roof panel opening and rearwardly so as to close the rear portion of the roof panel opening;
- first ON/OFF command means for commanding said drive means to move at least one of said front and rear portions of said flexible member;
- second ON/OFF command means for commanding said drive means to move at least one of said front and rear portions of said flexible member;
- control means, responsive to outputs from said first and second ON/OFF command means, for controlling activation of said drive means and for restricting movement of said flexible member in response to commands by said first ON/OFF command means; and
- wherein said control means is operable to restrict movement of said flexible member in response to commands by said first ON/OFF command means by causing said drive means to cause rearward movement of said rear portion of said flexible member in response to commands by said first ON/OFF command means only when said first ON/OFF command means provides two discrete commands to said drive means to move said rear portion of said flexible member rearwardly.

4. A slidable roof control device as recited in claim 3, wherein
said control means is operable to cause said drive means to move said rear portion of said flexible member rearwardly only when said first ON/OFF command means provides said two discrete commands within a predetermined time period to said drive means to move said rear portion of said flexible member rearwardly.

5. A slidable roof control device as recited in claim 3, wherein
said first ON/OFF command means is mounted in a forward location in the motor vehicle and adapted to be accessible to a driver and a front seat passenger;
said second ON/OFF command means is mounted in a rearward location in the motor vehicle and adapted to be accessible to rear seat passengers; and
said control means is operable to control activation of said drive means in response to commands from either of said first and second ON/OFF command means, and is operable to restrict movement of said flexible member in response to commands by said first ON/OFF command means by prohibiting said drive means from moving said rear portion of said flexible member in response to commands by said first ON/OFF command means under predetermined circumstances, so as to protect the rear seat passengers against unexpected closure of the rear portion of the roof panel opening.

6. A slidable roof control device as recited in claim 3, wherein
said drive means comprises a first drive motor operatively interconnected with said front portion of said flexible member for moving said front portion of said flexible member, and a second drive motor operatively interconnected with said rear portion of said flexible member for moving said rear portion of said flexible member.

7. A slidable roof control device for a motor vehicle having a roof panel defining an upper portion of a vehicle body, a roof panel opening formed in said roof panel and enclosed by a front header, a right roof rail, a left roof rail and a rear header, and a flexible member mounted on the roof panel and being foldable in the longitudinal direction of the vehicle body, said control device comprising:

- drive means operatively interconnected with a rear portion of said flexible member for selectively moving said rear portion of said flexible member forwardly so as to open a rear portion of the roof panel opening and rearwardly so as to close the rear portion of the roof panel opening;
- first ON/OFF command means, mounted at a forward location in the motor vehicle and adapted to be accessible to a driver and a front seat passenger, for commanding said drive means to move said rear portion of said flexible member;
- second ON/OFF command means, mounted at a rearward location in the motor vehicle and adapted to be accessible to rear seat passengers, for commanding said drive means to move said rear portion of said flexible member; and
- control means for controlling activation of said drive means in response to commands from either of said first and second ON/OFF command means, and for restricting movement of said flexible member in response to commands by said first ON/OFF command means by completely and at all times prohibiting said drive means from moving said rear portion of said flexible member rearwardly in response to commands by said first ON/OFF command means, so as to protect the rear seat passengers against unexpected closure of the rear portion of the roof panel opening.

8. A slidable roof control device as recited in claim 7, wherein
said drive means comprises a drive motor operatively interconnected with said rear portion of said flexible member for moving said rear portion of said flexible member.

9. A slidable roof control device for a motor vehicle having a roof panel defining an upper portion of a vehicle body, a roof panel opening formed in said roof panel and enclosed by a front header, a right roof rail, a left roof rail and a rear header, and a flexible member mounted on the roof panel and being foldable in the longitudinal direction of the vehicle body, said control device comprising:

- drive means operatively interconnected with a rear portion of said flexible member for selectively moving said rear portion of said flexible member forwardly so as to open a rear portion of the roof panel opening and rearwardly so as to close the rear portion of the roof panel opening;
- first ON/OFF command means, mounted at a forward location in the motor vehicle, for commanding said drive means to move said rear portion of said flexible member;

second ON/OFF command means, mounted at a rearward location in the motor vehicle, for commanding said drive means to move said rear portion of said flexible member;

control means, responsive to outputs from said first and second ON/OFF command means, for controlling activation of said drive means and for restricting movement of said flexible member, in response to commands by said first ON/OFF command means; and wherein said control means is operable to restrict movement of said flexible member in response to commands by said first ON/OFF command means by causing said drive means to cause rearward movement of said rear portion of said flexible member in response to commands by said first ON/OFF command means only when said first ON/OFF command means provides two discrete commands to said drive means to move said rear portion of said flexible member rearwardly.

10. A slidable roof control device as recited in claim 9, wherein
said control means is operable to cause said drive means to move said rear portion of said flexible member rearwardly only when said first ON/OFF command means provides said two discrete commands within a predetermined time period to said drive means to move said rear portion of said flexible member rearwardly.

11. A slidable roof control device as recited in claim 9, wherein
said first ON/OFF command means is adapted to be accessible to a driver and a front seat passenger;
said second ON/OFF command means is adapted to be accessible to rear seat passengers; and
said control means is operable to control activation of said drive means in response to commands from either of said first and second ON/OFF command means, and is operable to restrict movement of said flexible member in response to commands by said first ON/OFF command means by prohibiting said drive means from moving said rear portion of said flexible member in response to commands by said first ON/OFF command means under predetermined circumstances, so as to protect the rear seat passengers against unexpected closure of the rear portion of the roof panel opening.

12. A slidable roof control device as recited in claim 9, wherein
said drive means comprises a drive motor operatively interconnected with said rear portion of said flexible member for moving said rear portion of said flexible member.

13. A slidable roof control device as recited in claim 9, wherein
said drive means comprises a first drive motor operatively interconnected with said front portion of said flexible member for moving said front portion of said flexible manner, and a second drive motor operatively interconnected with said rear portion of said flexible member for moving said rear portion of said flexible member.

* * * * *